United States Patent [19]
Paramythioti et al.

[11] Patent Number: 4,873,449
[45] Date of Patent: Oct. 10, 1989

[54] PROCESS AND APPARATUS FOR THREE-DIMENSIONAL SURVEYING

[76] Inventors: Michel Paramythioti, 19 Bis. 7eme Avenue Le Lys, 60260 Lamorlaye; Auguste d'Aligny, 197, rue du Temple, 75003 Paris, both of France

[21] Appl. No.: 152,137

[22] Filed: Feb. 4, 1988

[30] Foreign Application Priority Data

Feb. 4, 1987 [FR] France ................... 87 01360

[51] Int. Cl.⁴ .............................................. G02B 27/42
[52] U.S. Cl. .......................................... 250/560; 356/1
[58] Field of Search ................. 250/560, 561; 356/1, 356/4, 376

[56] References Cited

U.S. PATENT DOCUMENTS

| 3,961,851 | 6/1976 | Gerharz | 356/1 |
| 4,102,571 | 7/1978 | Hayamizu et al. | 250/560 |
| 4,136,949 | 1/1979 | Hayamizu et al. | 356/1 |
| 4,146,327 | 3/1979 | Harris | 356/1 |
| 4,373,804 | 2/1983 | Pryor et al. | 356/1 |
| 4,456,829 | 6/1984 | Fohey | 356/1 |
| 4,567,347 | 1/1986 | Ito et al. | 356/1 |

Primary Examiner—David C. Nelms
Assistant Examiner—Eric F. Chatmon
Attorney, Agent, or Firm—Schweitzer & Cornman

[57] ABSTRACT

The invention relates to process and apparatus for three-dimensional surveying by triangulation with a laser beam source. Pursuant to known practice, a laser beam scans a scene to be surveyed, by means of controlled rotary positioning of a mirror. The reflected beam is detected by a linear array of photosensitive receptors, enabling the location of the illuminated point to be determined by triangulation. Significant to the invention is the use of a secondary light source for precision measurement of the angular location of the scanning mirror, rather than relying upon controlled positioning of the mirror, which is much less accurate.

12 Claims, 2 Drawing Sheets

PROCESS AND APPARATUS FOR THREE-DIMENSIONAL SURVEYING

BACKGROUND OF THE INVENTION

The present invention concerns a process and an apparatus for three-dimensional surveying.

A certain number of processes which allow three-dimensional readings to be taken are already known.

The oldest one is that of geodesic surveying, which can achieve excellent precision, but which has a very slow data collection speed. Therefore it is only possible to acquire a limited number of points during a reasonable period of time, and as a result the process cannot be used for a complex scene.

On the other hand, in photogrammetry (taking photographic views of the same scene from two different angles), the time of data collection is short, but the subsequent treatment by stereo restitution is complicated and expensive. Furthermore, the precision of this process is often insufficient.

A process of three-dimensional surveying has been proposed, to eliminate the disadvantage of these two methods, in which a scene is scanned by emitting a laser beam in its direction, the image of the laser spot obtained in this way is formed on at least one element of an assembly of photosensitive elements, the direction of the laser spot relative to the said assembly is deduced from the position of the excited receptor element in the said assembly of elements, and the three spatial coordinates of each point of scanning are calculated by triangulation on the basis of the orientation of the beam emitted and the said direction of the spot. Such a process is described in the French Pat. No. 2 129 747.

This process always yields insufficient results, because the emission of a laser beam can only be oriented with a precision which is much inferior to that with which the direction of the spot for reception can be measured. The overall precision of the reading is therefore directly limited by the precision of orientation of the laser beam.

It has therefore been proposed, for example in the French Pat. No. 2 363 779, to use at least two photosensitive receptors as the triangulation base, each of them forming an image of the laser spot exposed by the beam emitted. This process therefore requires that each point surveyed be viewed simultaneously from the point of emission of the laser beam and that of at least two photoreceptors. This results in new difficulties, since in surveying complex scenes, where masking phenomena are frequently produced, at least one of the lines of vision is often obscured.

SUMMARY OF THE PRESENT INVENTION

The present invention aims at eliminating these disadvantages, by providing a process and an apparatus which makes it possible to take three-dimensional readings of a large number of points of a complex scene at great speed, while avoiding masking problems to the greatest possible extent and obtaining a precision limited only by that of the photoreceptor, and not by that of the scanning mechanism of the laser beam.

To this end, the invention first of all has as its object a process of three-dimensional surveying in which a scene is scanned by emitting a laser beam in its direction, the image of the laser spot obtained in this way is formed on at least one element of an array of photosensitive elements, the direction of the laser sport relative to the said assembly is determined from the position of the excited receptor element with in the said array of elements, and the three spacial coordinates of each point of scanning are calculated by triangulation on the basis of the orientation of the beam emitted and the said direction of the spot, characterized by the fact that the scene is scanned by orienting the beam relatively roughly, that the orientation of the beam emitted is measured precisely, and that the said spatial coordinates are calculated on the basis of the measured orientation of the beam emitted and the said direction of the spot.

It should be noted right away that the terms "roughly" and "precisely" are to be considered as being relative to one another.

"Precisely" is understood to mean that the orientation of the beam emitted is measured with a precision of the same order of magnitude as that which the aiming direction of the laser spot can be measured at the level of the assembly of photosensitive elements, in such a manner as to base the determination of the spatial coordinates of the points of the scene on homogeneous data. On the other hand, "roughly" is understood to mean the fact that the beam emitted might possibly be oriented with a precision that is greatly inferior to that which is obtained with an array of photosensitive elements, since this orientation is not a determining factor in the process according to the invention. Good control of the emission is, however, desirable to the extent that it is a precondition for regularity of the scanning course. Possible orders of magnitude for the various precisions will be given below.

In the invention, the point of emission of the laser beam (in fact, the exit of the scanning device) is used as a base of triangulation on the one hand, and the optical center of the receptor organ comprising an array of photosensitive elements is used on the other hand. Each point of the scene, seen from these two points only, can therefore be the object of three-dimensional surveying, which makes it possible to analyze complex scenes with a minimum of masking problems.

Finally, due to the fact that a laser beam can be triggered very rapidly, it is possible to survey a very large number of points of the scene within a limited period of time.

Furthermore, the aforementioned excited receptor element can in fact be composed of a plurality of receptor elements. In this case, an interpolation between these different elements is carried out in a known manner, for example by means of real-time computer calculations. The direction of the laser spot relative to the assembly of photosensitive elements is thus known with very great precision.

Complete knowledge of the orientation of the beam emitted and of the aiming direction of the laser spot, in other words of four angles, is redundant for determining the three spatial coordinates of the point aimed at. Only its three angles are necessary.

Preferably, two emission angles and one reception angle are used to determine the three spatial coordinates.

In effect, the emission angles can be measured with a precision at least equivalent to that obtained at reception, as will be explained below.

It is advantageous to measure the two emission angles independently of one another.

The present invention also has as its object an apparatus for threedimensional surveying of a scene, comprised of a laser emitter, a scanning device for scanning the scene using the beam emitted by the laser, and a first photosensitive receptor to form an image of the spot created by the laser beam on the scene, characterized by the fact that it comprises means for measuring the orientation of the beam at the exit of the scanning device.

This scanning device can comprise a mirror which can be moved around an axis and reflects the beam emitted by the said laser, with the said means of measurement comprising a secondary source of light illuminating the said mirror and a second photosensitive receptor to receive the beam emitted by the secondary source and reflected by the mirror.

The axis of rotation of the said mirror preferably passes through the plane of the mirror and intersects with the optical axis of the laser and the optical axis of the second photosensitive receptor.

The said second photosensitive receptor is preferably composed of a linear camera comprising an array of photosensitive elements arranged in the plane which passes through the said secondary source and which is perpendicular to the axis of the rotation of the mirror.

This receptor makes it possible to measure the angular position of the scanning mirror with precision, and therefore to measure a characteristic angle (azimuth angle) of the orientation of the laser beam emitted.

The said scanning device can also be comprised of a mounted platform which pivots on a fixed structure, with the said means of measurement then comprising an angular collector to measure the pivoting angle of the platform relative to the structure.

For this purpose, an optical coder with standard commercial precision can be used.

This coder thus measures the second angle (angle of sight) determining the orientation of the laser beam emitted.

It should be noted that since the angle of sight is not part of the triangulation, the precision obtained using an optical coder is sufficient to measure this angle.

According to another aspect of the invention, the said scanning device consists of a mounted platform which pivots on a fixed structure, and a mobile mirror mounted on the said platform and reflecting the beam emitted by the laser, and the said first photosensitive receptor is mounted in fixed relation to the platform and comprises an array of photosensitive elements arranged in the plane scanned by the reflected beam upon rotation of the mirror and receiving the image of the laser spot produced by the beam on the scene.

The said first photosensitive receptor is preferably a linear camera, the optical center of which is situated on the pivoting axis of the platform.

Also, the axis of rotation of the mirror is preferably positioned in such a way as to intersect the pivoting axis of the platform in an essentially perpendicular direction.

In a specific embodiment of the invention, the said pivoting axis of the platform is identical with the optical axis of the laser emitter.

In other words, the apparatus according to the invention can be analyzed as consisting of a platform equipped to provide two-dimensional optical data collection by means of horizontal scanning and triangulation in the plane aimed at by the camera which comprises the first photosensitive receptor, with vertical scanning being obtained by pivoting the platform relative to a structure, around an axis which passes through the base of triangulation, with each position of the platform providing a scanning line.

Now, a specific embodiment of the invention will be described as a non-limiting example, with reference to the drawings attached, where:

DETAILED DESCRIPTION OF INVENTION

Figure 1:
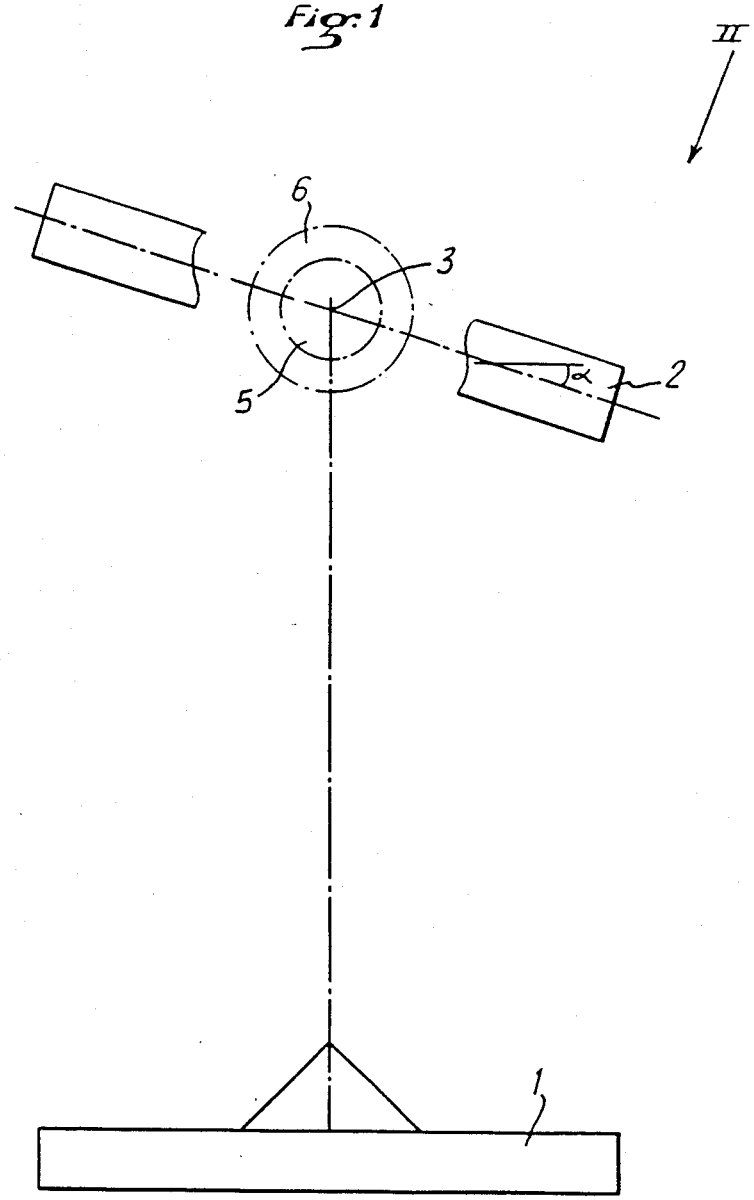
FIG. 1 is a schematic side view of an apparatus according to the invention.

FIG. 1 shows the fixed structure 1 of this apparatus, on which a platform 2 is mounted to pivot around an axis 3. This platform is supported by two pilings 4 (FIG. 2), and rotated by means of a step motor 5, or any other equivalent means.

An optical coder 6 mounted on the axis 3 gives the measure of the angle $\alpha$ which the platform 2 forms relative to the structure 1.

Figure 2:
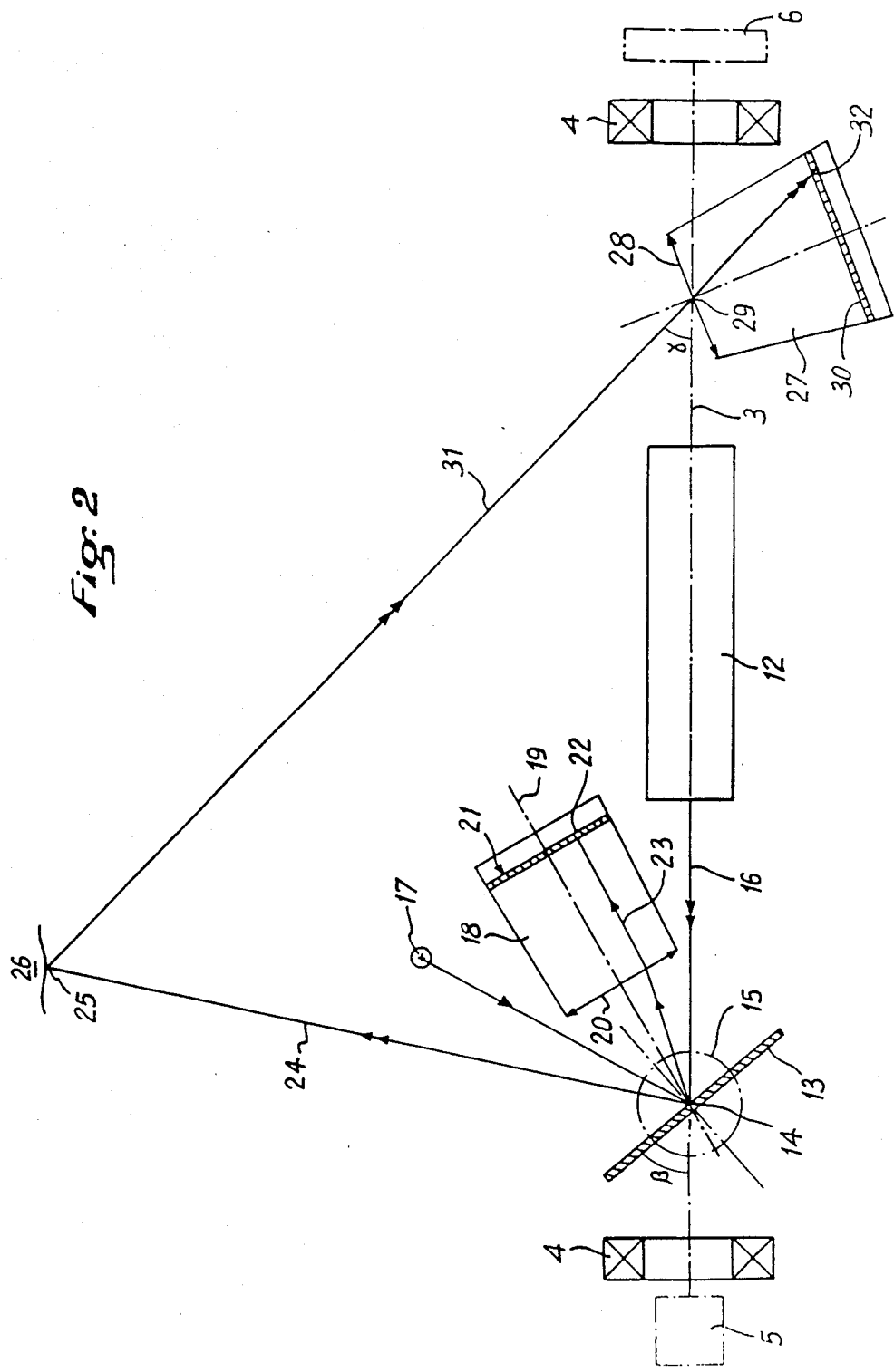
FIG. 2 is a schematic view as indicated by the arrow II of FIG. 1.

Referring now to FIG. 2, a laser 12 is mounted on the platform 2 with its optical axis being identical with the pivoting axis 3. A mobile mirror 13 is mounted on the platform 2 around an axis of rotation 14, and can be rotated by means of a galvanometer 13. The axis of rotation 14 is located in the plane of reflection of the mirror 13, perpendicular to the axis 3. As a result, the beam 16 which issues from the laser 12 strikes the mirror 13 on its pivoting axis 14 and therefore appears to issue from a fixed point.

A secondary light source 17 and a linear camera 18 are also mounted on the platform 2, in such a manner that the diode 17 illuminates the mirror 13. The optical axis 19 of the objective 20 of the camera 18 intersects the axis of rotation 14 of the mirror in a perpendicular direction, its array 21 of photosensitive elements being located in a plane perpendicular to the axis 14.

In the present case, the objective 20 is arranged behind the reflection of the mirror 13, but it can also be arranged in front.

Thus, knowledge of the photosensitive element 22 illuminated by the beam 23 which issues from the source 17 and is reflected by the mirror 13 gives a measure of the angle of orientation $\beta$ of the mirror 13 relative to the axis 3.

The principal laser beam 16 reflected at 24 forms a luminous spot at point 25 of the scene 26.

A linear camera 27 is mounted on the platform 2 in such a way that its objective 28 has its optical center 29 on the axis 3, its array 30 of photosensitive elements is located in the plane which contains the axis 3 and perpendicular to the axis 14, in other words the plane of the beams 16 and 24.

Thus, the beam 31 diffused by the luminous spot 25 gives an image of this spot on a photosensitive element 32 of the array 30. Knowledge of this element 32 gives the measure of the angle $\gamma$ between the axis 3 and the straight line which connects the point 25 aimed at the optical center 29 of the camera 27.

The length of the base of triangulation, in other words the distance between the optical center 29 of the camera 27 and the axis of rotation 14 of the mirror 13, as well as the values of the angles $\beta$ and $\gamma$, make it possible to solve the triangle (14, 25, 29) and therefore to determine the position of the point 25 in the plane which contains the axis 3 and which is perpendicular to the axis 14 (plane of FIG. 2). Since this plane is known from the value of the angle $\alpha$ by which the platform 2 is inclined relative to the structure, the three spatial coordinates of the point 25 can be deduced by a reference connected to this structure.

As an example, arrays of 4096 diodes can be used for the arrays 21 and 30 of photosensitive elements. These arrays easily lend themselves to an interpolation calculation, which makes it possible to position the image of the luminous source aimed at to a fraction of the nearest diode. The typical deviation of the position of the image which results is on the order of 1µ, which gives a precision on the order of several seconds of arc for the measures of the angles $\beta$ and $\gamma$, as a function of the focal length used.

The galvanometer allows rapid scanning, for example from 200 to 300 positions of the mirror 13 per second, with a separation of several minutes of arc between two successive positions.

The angular precision of positioning the platform 2 and the mirror 13 obtained using the motor 5 and the galvonmeter 15 can be on the order of a minute of arc, which can be compared to the aforementioned precision obtained for the angle measurement. The measurement obtained for the angle $\beta$ is even better than that obtained for the angle $\gamma$, because the image of the secondary source, controlled in terms of luminosity and distance, is better defined than the image of the laser spot provided by the camera 27. Thus, a precision for the spatial coordinates of each point aimed at is obtained, which approaches that which can be achieved by geodesic surveying.

However, the speed of data collection is incomparably superior, since one can, for example, obtain a file of three coordinates of 250,000 points of a scene in a time on the order of 10 to 15 minutes.

Various variations and modifications can, of course, be made in the preceding description, without thereby leaving the scope or the spirit of the invention.

In particular, measurement of the angle $\beta$ can be carried out by reflection on the other face of the mirror 13.

Also, a redundant camera can be provided, arranged like the camera 27, but at a certain distance from the latter on the axis 3, in such a manner as to eliminate the majority of the masking problems which occur in the analysis of a very complex scene.

Also, an intermediary optical control device can be placed between the laser source and the mirror, in order to assure perfect orientation of the incident beam on the latter.

We claim:

1. A process of three-dimensional surveying in which a scene is scanned by emitting a laser beam in its direction, the image of the laser spot obtained in this way being formed on at least one element of an array of photoresistive receptor elements, the direction of the laser spot relative to the said array being determined from the position of the exited receptor element in said array of elements, and the three spatial coordinates of each point of scanning being calculated by triangulation on the basis of the angular orientation of the beam emitted and the said direction of the reflected spot received, characterized by the fact that
   (a) the scene is scanned by controllably orienting the beam relatively roughly,
   (b) the orientation of the beam emitted being measured more precisely independently of the controllable orientation thereof, and
   (c) that the said spatial coordinates are calculated on the basis of the independently measured orientation of the beam emitted and the said direction of the spot.

2. A process according to claim 1, characterized by the fact that
   (a) two emission angles and one reception angle being used to determine the said spatial coordinates,
   (b) one of said emission angles being in the plane of triangulation, and
   (c) the other of said emission angles being at right angles to said plane.

3. A process according to claim 2, characterized by the two emission angles being measured independently of one another.

4. An apparatus for three-dimensional surveying of a scene, comprised of a laser emitter, a rotationally movable scanning device for scanning the scene using the beam emitted by the laser, and a first photosensitive receptor means adapted to form an image of the spot created by the laser beam on the scene, characterized by
   (a) means for controllably orienting said emitted beam, and
   (b) independent means for measuring the orientation of the beam at the exit of the scanning device.

5. An apparatus according to claim 4, characterized by
   (a) said scanning device comprising a mirror which can be moved around an axis and reflects the beam emitted by the said laser,
   (b) said means for measuring comprising a secondary source of light illuminating the said mirror and a second photosensitive receptor to receive the beam emitted by the secondary source and reflected by the mirror.

6. An apparatus according to claim 5, characterized by
   (a) said laser and said second photosensitive receptor each having an optical axis, and
   (b) the axis of rotation of said mirror passing through the plane of the mirror and intersecting with the optical axis of the laser and the optical axis of the second photosensitive receptor.

7. An apparatus according to claim 5, characterized by said second photosensitive receptor being comprised of a linear camera comprising an array of photosensitive elements arranged in the plane which includes the axis of said secondary light source and which is perpendicular to the axis of rotation of the mirror.

8. An apparatus according to claim 4, characterized by
   (a) said scanning device being comprised of a platform mounted on a fixed structure for pivoting movement with respect thereto, and
   (b) means for measuring the pivoting angle of the platform relative to the fixed structure.

9. An apparatus according to claim 4, characterized by
   (a) said scanning device comprising a platform mounted on a fixed structure for pivoting movement with respect thereto,
   (b) a mobile mirror mounted on the said platform and reflecting the beam emitted by the laser, and
   (c) said first photosensitive receptor being arranged in the plane scanned by the reflected beam upon rotation of the mirror to receive the image of the laser spot produced by the beam on the scene.

10. An apparatus according to claim 9, characterized by said first photosensitive receptor comprising a linear camera, the optical center of which is situated on the pivoting axis of the platform.

11. An apparatus according to claim 9, characterized by the axis of rotation of the mirror intersecting the pivoting axis of the platform in an essentially perpendicular direction.

12. An apparatus according to claim 9, characterized by the pivoting axis of the platform being identical with the optical axis of the laser emitter.

* * * * *